United States Patent

[11] 3,610,798

| [72] | Inventor | Francis J. Murphree<br>Maitland, Fla. |
|---|---|---|
| [21] | Appl. No. | 858,671 |
| [22] | Filed | Sept. 17, 1969 |
| [45] | Patented | Oct. 5, 1971 |
| [73] | Assignee | The United States of America as represented by the Secretary of the Navy |

[54] SONAR ECHO SIMULATOR
9 Claims, 7 Drawing Figs.

[52] U.S. Cl.................................................... 35/10.4
[51] Int. Cl..................................................... G09b 9/00, G01s 9/66
[50] Field of Search........................................ 35/10.4

[56] References Cited
UNITED STATES PATENTS

| 3,555,165 | 1/1971 | Ettenhofer | 35/10.4 |
| 2,881,535 | 4/1959 | Harwood et al. | 35/10.4 |
| 2,887,671 | 5/1959 | Frankel et al. | 35/10.4 X |

Primary Examiner—T. H. Tubbesing
Attorneys—R. S. Sciascia, John W. Pease and Harvey A. David ABSTRACT: A sonar echo simulator utilizes analog and digital means to generate a series of highlight trigger signals the timing of which is related to simulated target length, length of insonifying pulse, and target aspect angle. The highlight trigger pulses are applied to pulse function generator means which produces a plurality of highlight echo signals. The highlight echo signals are variably attenuated and added to provide a composite echo signal which is further attenuated in accordance with insonifying pulse length and aspect angle to provide a realistic simulated echo signal.

FRANCIS J. MURPHREE
INVENTOR.

BY Harvey A. David

ATTORNEYS

FRANCIS J. MURPHREE
INVENTOR.

BY Harvey A. David

ATTORNEYS

SONAR ECHO SIMULATOR

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to sonar echo simulators and more particularly to means for generating simulated echo signals suitable for either a video or carrier frequency audible presentation of echoes such as might be returned from a submarine.

A natural target echo may be assumed to comprise a summation of echoes from a number of discrete points along the length of the target, the envelope of which echoes varies in length with target length $s$, the velocity of sound C, and aspect $\theta$ of the target. The total echo length may be taken as $2s/C|\cos\theta|+T$, where $T$ is the insonifying pulse length. The natural echo envelope is also characterized by varying amplitudes along its length in accordance with target highlights, that is to say with variations in reflectivity along the target length due to irregularities in shape, wake, etc.

A pulsed sinusoid is frequently used to simulate a sonar echo. This method is economical but lacks realism since the echo resembles, at all times, that from a beam aspect target. Further, it has not been possible with that technique to show echo elongation as a function of aspect and/or target highlights. This latter limitation makes the pulsed sinusoid form of simulation unsuitable for use in training personnel in the use of equipment intended to "classify" a target by the structure of its echo.

Another form of echo simulation involves the use of general purpose digital computer means. This method is particularly suitable for video displays but can be used for carrier frequency simulation as well. It has the advantage that, in principle, it can be used to simulate any phenomena reducible to a mathematical model. The relative disadvantage of the digital computer/math model simulation is high cost, complexity, and the fact that the computer must be programmed. This last is not only a costly and time consuming factor, but also limits the flexibility of the system.

BRIEF SUMMARY OF THE INVENTION

With the foregoing in mind it is a principal object of the present invention to provide a sonar echo simulator utilizing a novel combination of digital and analogue techniques to generate a simulated echo based on a simplified model of a reflecting target.

Another object of the invention is the provision of an echo simulation generating apparatus for producing simulated echoes the envelope shape and length of which change with pulse length, aspect angle $\theta$, and frequency in a manner similar to that of a natural echo.

As another object the present invention aims to accomplish the foregoing, through the combination of a $2s/C|\cos\theta|$ and highlight generator means which produces a series of highlight trigger signals at times corresponding to individual echoes from selected points along a simulated target, a pulse function generator means which utilizes the highlight trigger signals to produce a plurality of highlight echo signals and then combines them into a composite signal, and amplitude adjustment means which attenuates the composite signal in accordance with pulse length and aspect angle to produce a signal which is quite realistic when presented audibly or on a video display.

Still another object is the provision of simulated echo generating apparatus of the foregoing character which is easily controlled to alter aspect angle, highlight characteristics, and the like to permit ready "construction" of a desired simulated target for uses such as in training apparatus, study of target types, and testing of sonar equipment.

BRIEF DESCRIPTION OF THE DRAWINGS

Other objects, advantages and novel features of the invention will become apparent from the following detailed description of a preferred embodiment of the invention when considered in conjunction with the accompanying sheets of drawings, wherein.

DESCRIPTION OF THE PREFERRED EMBODIMENT

Figures 1, 6:
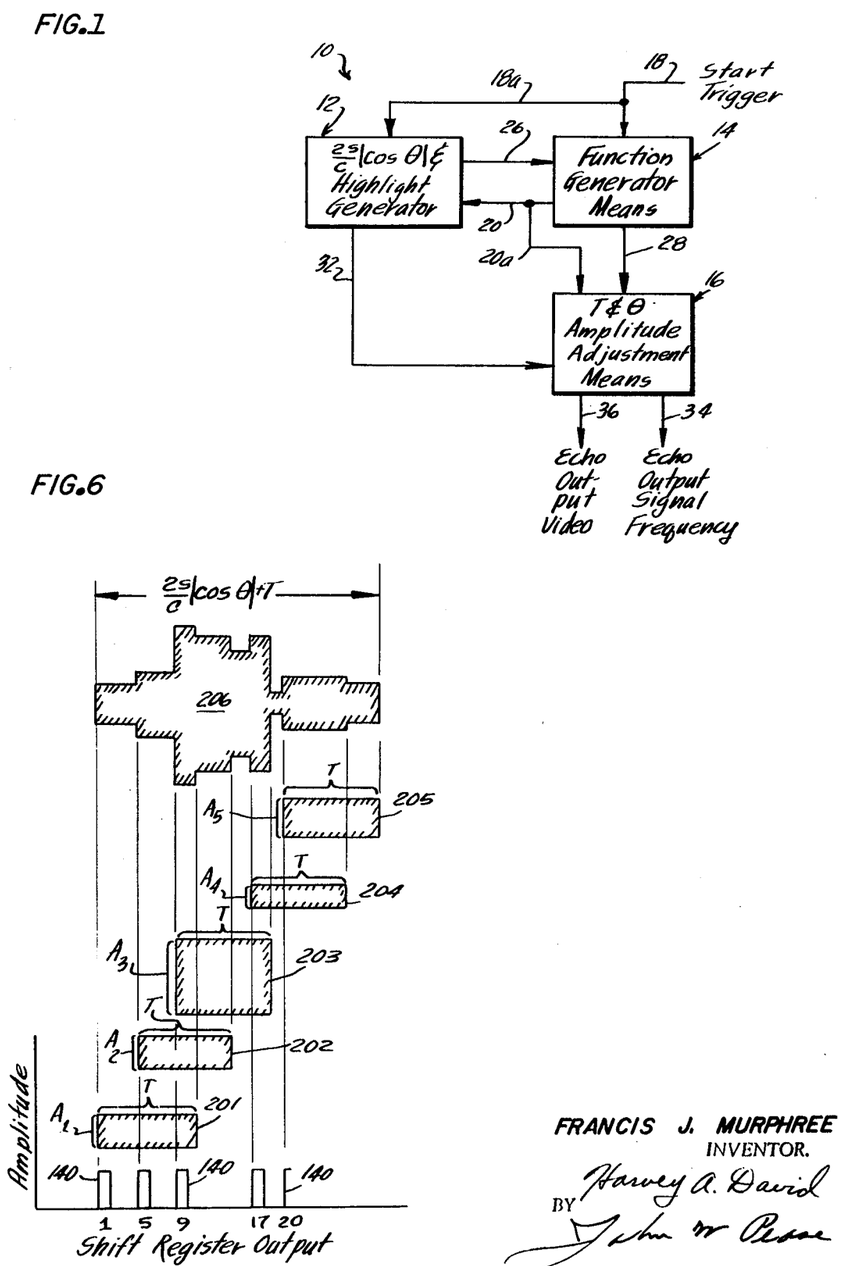
FIG. 1 is a diagrammatic illustration in block form of echo simulating apparatus, or simulator, embodying the present invention.
FIG. 6 is another graphic illustration showing additional signal and time relationships.

The echo simulator 10 illustrated in the drawings and described hereinafter as an exemplary embodiment of the invention comprises three major components as shown in FIG. 1. These are a $2s/C|\cos\theta|$ and highlight trigger generator means 12, a pulse function generator 14, and a pulse length and aspect angle amplitude adjustment device 16. Each of these components and their interrelations will later be described in more detail as the specification proceeds.

Briefly stated however, the pulse function generator means 14 is connected to receive a start trigger pulse as shown by flow line 18, which start trigger pulse may be derived for example from the keying circuit of a larger, more comprehensive sonar simulator which the echo simulator 10 being described forms a part. This may also be true of the insonifying pulse length T, and the insonification frequency $f_1$. The generator means 14 provides, as one output, a pulsed insonification frequency signal for each start trigger pulse. The insonification frequency within each pulse will be determined by the type of sonar echo to be simulated. Thus, the generator can provide pulsed CW (continuous wave), FM (frequency modulation) slides, psuedorandom noise, or other functions. Although the invention will be described hereinafter with reference to pulsed CW, it will be understood that the invention contemplates simulation of the other just mentioned types of sonar echo as well. The pulsed CW signal, which is T units long and at the insonification frequency $f_1$, is applied via line 20 to the $2s/C|\cos\theta|$ and highlight generator 12.

The generator 12 calculates the maximum echo length insofar as it is determined by the target length $s$, the velocity of sound C, (a constant for purposes of the invention), and the aspect angle $\theta$. Additionally, the generator 12 produces a plurality of outputs in the form of trigger pulses each of which is made to occur at a selected time within the interval $2s/C|\cos\theta|$, and which are applied to the function generator 14 as shown collectively in FIG. 1 by flow line 26.

The function generator 14 is responsive to the trigger pulses to generate a plurality of highlight simulating signals one for each trigger pulse, and each having a frequency and amplitude corresponding to an assigned highlight of a target echo to be simulated. Usually, of course, the frequency of each highlight will be the same as the other highlights within each target echo. These highlight simulating signals are combined within the generator 14 to produce a composite signal representative of a series of such highlights. This composite signal is applied as shown via line 28 to the T and $\theta$ amplitude adjustment means 16.

The device 16 modifies the composite signal to automatically adjust the average echo amplitude so that it varies in the same ratio, as a function of T and $\theta$, as would the target echo being simulated. Signals representative of T and $\theta$ are applied via lines 20a, 32 to the amplitude adjustment means 16, the outputs of which may be in the form of either a signal frequency via line 34 which can be converted to an audio presentation or in the form of a video signal via line 36 for presentation on a cathode-ray scope (not shown).

Figure 2:
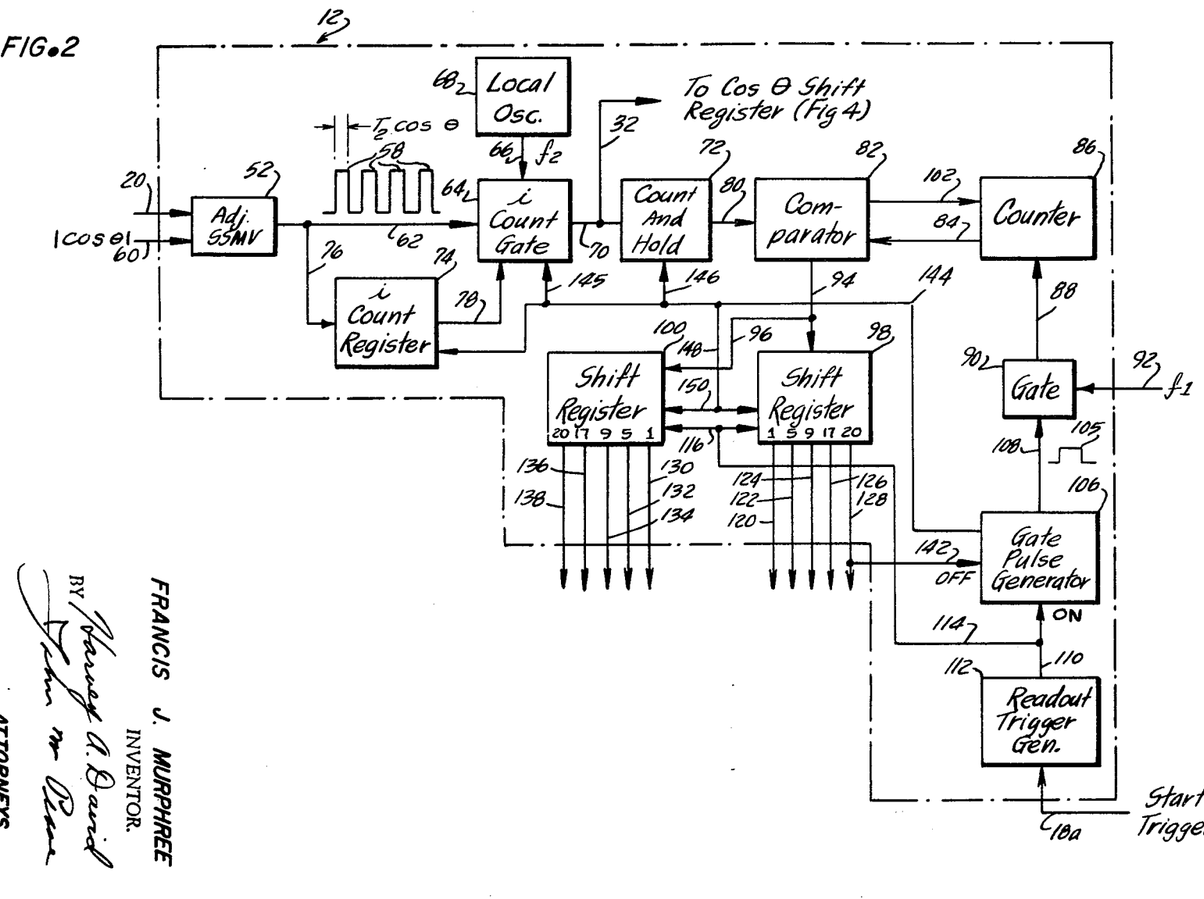
FIG. 2 is a more detailed diagrammatic illustration in block form of a portion of the apparatus of FIG. 1.
Figure 5:
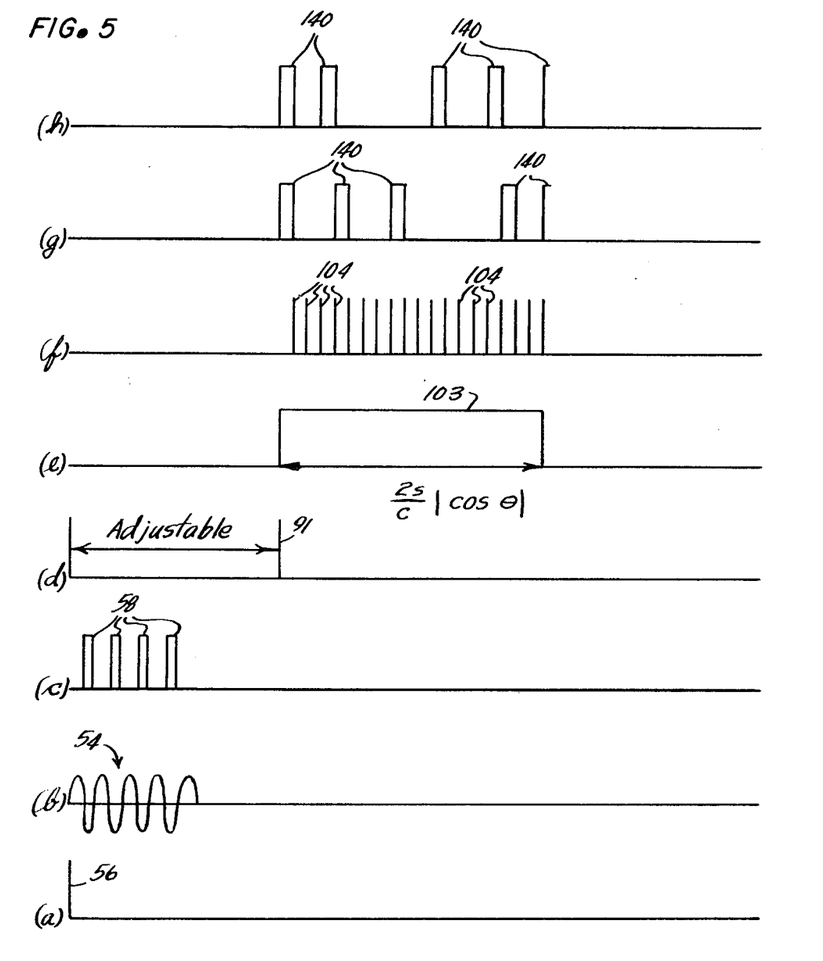
FIG. 5 is a partial time diagram in graphic form illustrating the relationships of various signal in operation of the apparatus.

Referring to FIGS. 2 and 5, the $2s/C|\cos \theta|$ and highlight trigger generator 12 will be described in more detail. Thus, the pulsed CW from the function generator via line 20 is applied to an adjustable single shot multivibrator 52. The pulsed Cw signal is indicated generally at 54 on time line b in FIG. 5, the CW pulse 54 beginning with a start trigger pulse 56 of time line a and lasting T time units. The start trigger pulse 56 is that applied via line 18 to the pulse function generator means 14.

The single shot multivibrator 52 is turned "on" once each cycle of the CW pulse 54. Each "on" period, indicated at 58 along time line c of FIG. 5, is $T_2|\cos \theta|$ seconds, where $T_2$ is less than one period (1/f) of the Cw frequency, and $\theta$ is the aspect angle of the target being simulated. The $|\cos \theta|$ function is introduced as shown by line 60 by manually or otherwise adjusting the "on" period 58 of the multivibrator 52 in accordance with changes in $|\cos \theta|$.

The output pulses 58 of the multivibrator 52 are applied via line 62 as a control input to a gate 64. The gate 64 receives, via line 66, a frequency $f_2$ derived from a local oscillator 68 and bearing a relationship to $f_1$ which will be stated as the description proceeds. Each pulse 58 accepted by gate 64 causes the gate to pass approximately $T_2|\cos \theta|f_2$ cycles via line 70 to a count and hold circuit 72.

A shift register 72 is connected to receive the pulses 58 via line 76, and provides an output on line 78 to the gate 64 closing that gate when $i$ pulses 58 have been accepted. Accordingly, the count and hold circuit 72 will receive $iT_2|\cos \theta|f_2$ cycles, where $f_2 = 2sf_1/icT_2$. The count held in the count and hold circuit 72 after the gate 64 is closed is applied via line 80 to a comparator 82.

The comparator 82 is connected to receive via line 84 the count in a counter 86 which is connected via line 88 to receive a frequency $kf_1$ through a gate 90 during periods initiated by a readout trigger indicated at 91 on line d of FIG. 5. The generation of the readout trigger 91 will be described presently. The frequency $kf_1$ is derived in any suitable manner from the simulated insonification frequency $f_1$, k being any desirable integer including 1, and is applied as shown by line 92. At this point it may be noted that either $f_1$ or $f_2$ could be chosen first; generally $f_2$ would be chosen first so that the product $i|\cos \theta|T_2f_2$ is not so large as to require excessive counting capacity in counters 72 and 86 when $|\cos \theta|$ equals one or so small that the stored count for small values of $|\cos \theta|$ is not large enough (roughly less than 10). Moreover, because in actuality echo parameters tend to vary somewhat randomly from ping to ping, the sources of $f_1$ and $f_2$ may include means to introduce small random changes in $f_1$ and/or $f_2$.

If, after the $iT_2|\cos \theta|f_2$ cycles are stored in the count and hold circuit 72, the frequency $kf_1$ is applied through gate 90 to the counter 86 in response to readout trigger 91, the time required for the count in counter 86 to reach the count held in the count and hold circuit 72 will be found to be $2s/kc|\cos \theta|$ seconds. This is the time at which a readout pulse is obtained from the comparator 82 via lines 94 to 96 to two, twenty stage shift registers 98, 100, the purposes of which will presently be made apparent. Also, at this time a reset pulse is sent from the comparator 82 via line 102 to the counter 86 so that it starts counting from zero again. This will continue as long as the $kf_1$ signal is fed into the counter 86.

Now, if k is given a value of 20, corresponding to the number of stages in each of the shift registers 98 and 100, it will be recognized that there will be 20 readouts from the comparator 82 during each $2s/C|\cos \theta|$ period. This is illustrated in FIG. 5 wherein the period $2s/C|\cos \theta|$ is indicated at 103 on base line e and the comparator outputs are indicated at 104 on base line f.

The gate 90 is controlled by gating pulses 105 from a gate pulse generator 106 via line 108. The gate pulse generator 106, which may be a bistable multivibrator, is turned on to initiate a gating pulse 105 by the previously mentioned readout trigger pulse 91 applied to the generator 106 via line 110 from a readout trigger pulse generator 112. The generator 112 may conveniently be a single short multivibrator and provides a pulse on line 110 a predetermined time after receiving each start trigger pulse via line 18a.

Each comparator readout pulse applied to the shift registers 98, 100 via lines 94, 96 causes a logical one to move one position to the right in each of the registers 98, 100. If the register 98 has n stages (in this case $n=20$) and a readout connection were made to each stage, then a one would be read on the first stage after the first pulse from comparator 82, on the second stage after the second pulse, and on the nth stage after the nth pulse.

It should be noted at this point that the first pulse to each shift register 98, 100, is the readout trigger pulse from generator 112 via lines 114, 116. This is done to start the echo at the time that the first reading of the count and hold circuit 72 begins. Since both registers shift in the same direction so that when the readout of circuit 72 begins, both stage 20 of register 100 and stage 1 of register 98 will be on simultaneously. Thereafter register 98 will shift toward 20 and register 100 will shift toward 1. For this description it will be assumed that output connections are made to the 1st, 5th, 9th, 17th, and 20th stages of each of the shift registers 98, 100, as indicated by lines 120, 122, 124, 126, and 128 with respect to register 98, and by lines 130, 132, 134, 136, and 138 with respect to the register 100. These connections provide signals 140 (as shown on lines g and h of FIG. 5) which are representative of the times of occurrence of target highlights and are utilized in the function generator means 14 in a manner which will presently be described with reference to FIG. 3.

The output on line 128 from the last stage of the register 98 is also utilized, via line 142, to turn off the gating pulse generator 106 and terminate the pulse 103. At the same time the generator 106 sends a reset to zero pulse via lines 144, 145, and 146 to the i count register 74, to the i count gate 64 and to the count and hold circuit 72, and by lines 148, 150 to the shift registers 98, 100.

Figure 3:
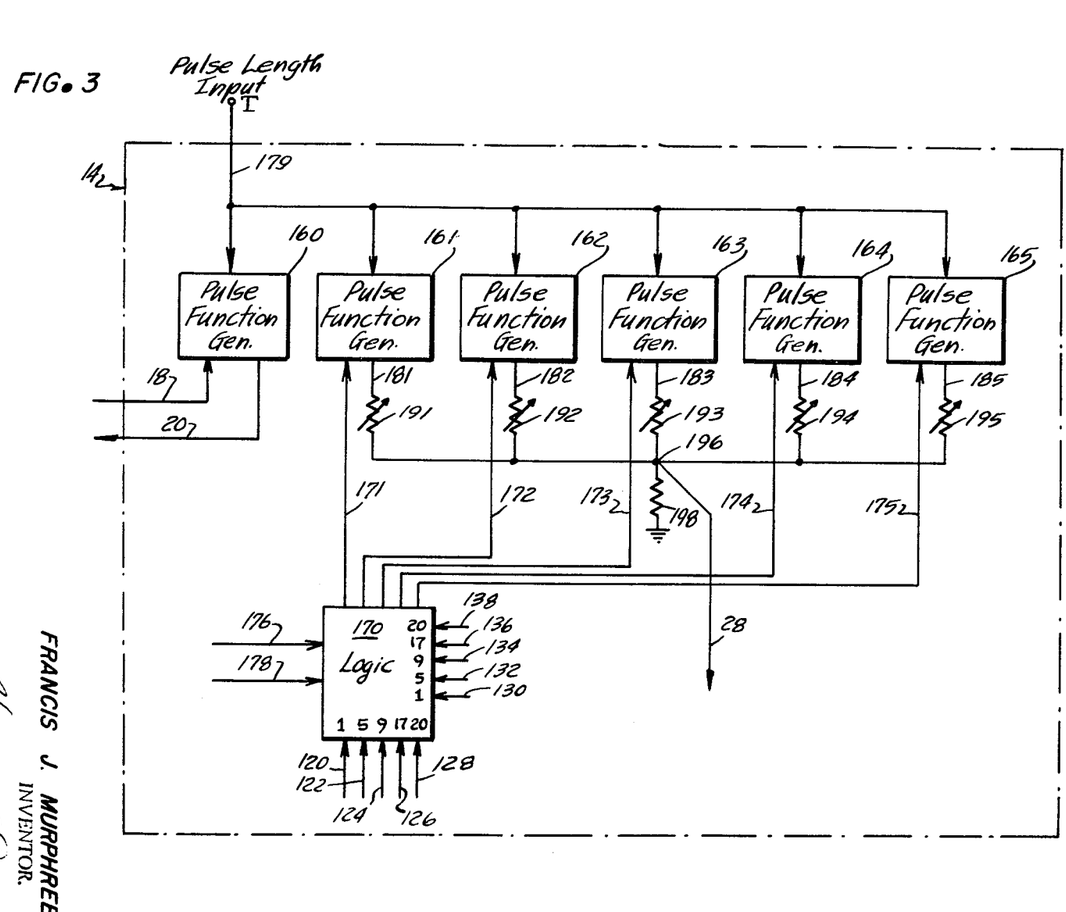
FIG. 3 is another detailed diagrammatic illustration in block form of another portion of the apparatus of FIG. 1.

Referring now to FIG. 3, the function generator means 14 comprises a plurality of pulse function generators 160, 161, 162, 163, 164, and 165, each of which is designed to provide an output signal of frequency $f_1$ in response to a momentary pulse in the form of the start trigger pulse via line 18 for the pulse function generator 160 and in the form of the highlight trigger pulses 140 in the cases of the remaining pulse function generators. In the latter cases the highlight trigger pulses are passed to the generators 161, 162, 163, 164, and 165 via lines 171, 172, 173, 174, and 175 from logic means 170.

Figure 3A:
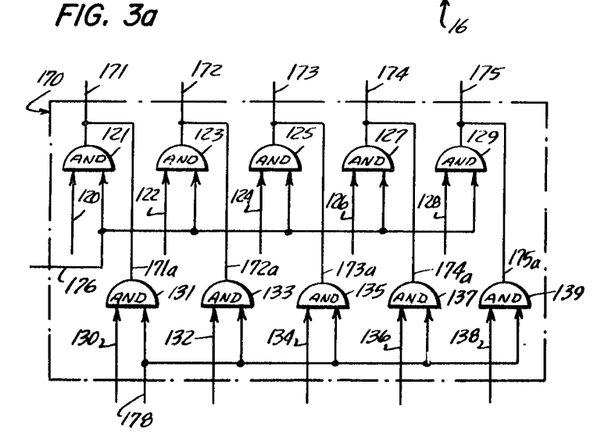
FIG 3A is a diagrammatic illustration of logic means of FIG. 3.

The logic means 170, which will be described with reference to FIG. 3A, is connected to receive the highlight trigger signals from the shift registers 98, 100 of the generator 12. It is apparent that as $\theta$ changes from 0° to 90° and thence to 180°, that the relative position of the target highlights reverse. That is to say, echoes originating near the bow of the target arrive before those coming from the stern when $\theta$ is less than 90°, but arrive after those from the stern when $\theta$ is greater than 90°. To account for this, the pulse function generators 161–165 must be triggered in the reverse sense in the interval 90°–180b$L$as compared to the 0°–90° interval. This is accomplished through the use of the two shift registers 98 and 100 together with the logic means 170 which is responsive to a bow or stern aspect input signal applied via lines 176, 178, respectively.

Referring now to FIG. 3A, the logic circuit 170 is shown in more detail as comprising a series of AND-gates 121, 123, 125, 127, and 129 each connected to receive the bow aspect signal when on line 176. When a coincidence of signals exists between line 176 and any one of lines 120, 122, 124, 126, or 128, the corresponding function generator 161, 162, 163, 164, or 165 is activated.

Similarly, the logic circuit 170 also comprises AND-gates 131, 133, 135, 137, and 139 connected to receive the stern aspect signal when on line 178. When a coincidence of signals exists between line 178 and any one of lines 130, 132, 134, 136, or 138, the corresponding function generator 161, 162, 163, 164 or 165 is activated via line 171a, 172a, 173a, 174a, or 175a.

The length of the pulse generated by each pulse function generator, as well as the character of the signal (pulsed CW, pulsed FM, etc.) may be chosen by manual or computer generated commands. It should be particularly noted that each pulse function generator could be a memory device having stored in it the echo generating signal. The highlight trigger pulses would start readout. The outputs on lines 181–185 are applied to variable attenuators 191–195, respectively, which are connected to a common summing junction 196, the junction 196 being separated from ground or other reference potential by a resistor 198.

Referring to FIG. 6, the output pulse 140 corresponding to stage 1 of shift register 98 triggers the generator 161 to produce an output on line 181 having a length $T$ and a frequency $f_1$, and which, after attenuation by resistor 191, has an amplitude $A_1$. This attenuated output of generator 161 is represented by the area 201 in FIG. 6. Similarly, the generators 162–165 and resistors 192–195 produce more or less attenuated outputs 202–205, respectively, each of length $T$ and having amplitudes $A_2$–$A_5$. These attenuated outputs, occurring at times initiated by the highlight trigger pulses 140, are combined at summing junction 196 into a composite echo output represented by area 206 of frequency $f_1$, length $2s/C|\cos \theta| + T$, and an amplitude which varies in accordance with highlights from a target being simulated.

It will be recognized that the relative positions of the highlights within the composite echo can be varied to suit a particular target to be simulated by selecting the stages of the shift registers 98, 100 from which outputs 140 will be taken. It will also be recognized that the amplitude or intensity of each highlight can be selected by varying the resistors 191–195. Accordingly, an instructor can "construct" a target echo to resemble that from any of various classes of ships, submarines or the like.

The average amplitude of an echo from a given target is a function of the insonifying pulse length $T$ and the target aspect angle $\theta$. Briefly stated, the echo amplitude increases with increases in pulse length $T$, and increases as the aspect angle approaches 90° (beam aspect) from either direction. The $T$ and $\theta$ amplitude adjusting means 16 serves the purpose of adjusting the average amplitude of the output signal from junction 196 via line 28 in accordance with changes in $T$ and $\theta$. This is accomplished by utilizing the known $T$ and $\theta$ information to control the amplitude adjustment means 16 which is the form of a digital attenuator.

Figure 4:
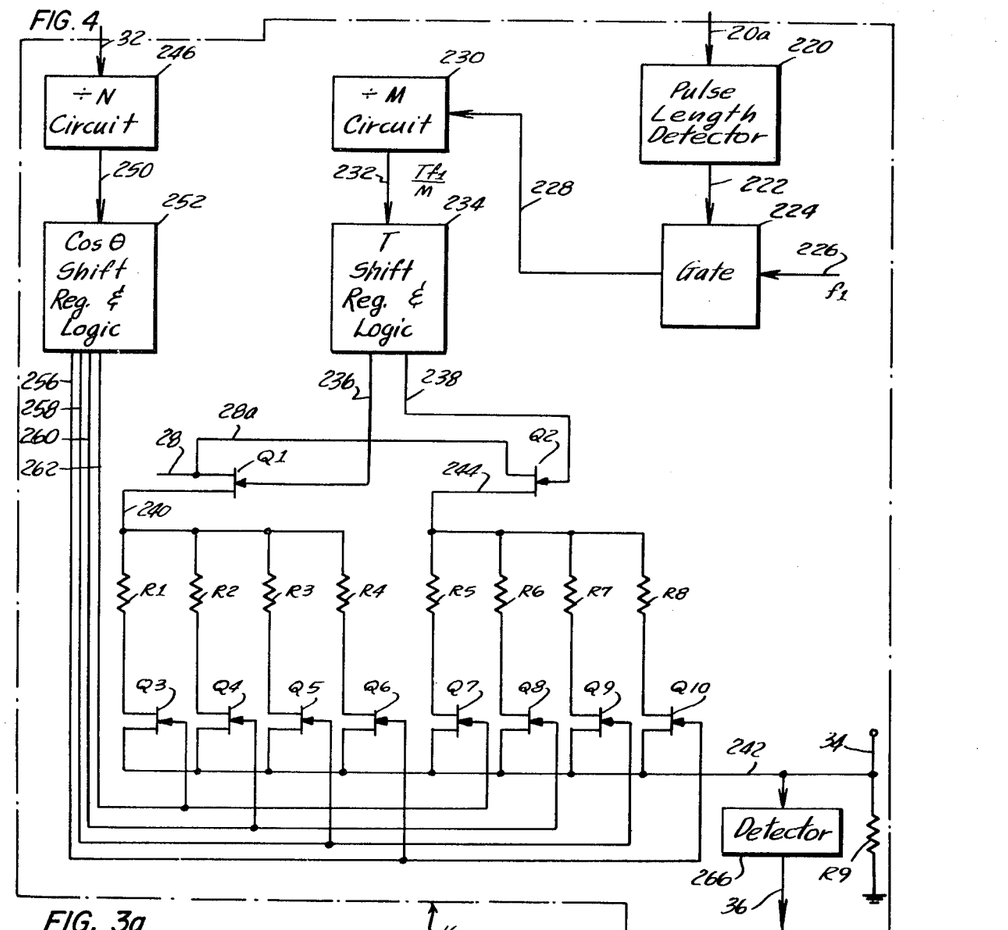
FIG. 4 is a diagrammatic illustration in block form of still another portion of the apparatus of FIG. 1.

Referring now to FIG. 4, the amplitude adjustment means 16 comprises a pulse length detector 220 which receives the pulsed CW output of pulse function generator 160 via lines 20, 20a. The AC output of the generator 160 is applied to the detector 220, the output of which is in the form of a rectified output signal of length T. This is applied via line 222 as the control input to a gate 224 having the frequency $f_1$, as a controlled input via line 226. The rectified output of detector 220 turns "on" gate 224 allowing $f_1 T$ cycles to be applied via line 228 to a divide by M circuit 230. Each output impulse generated by the divide by M circuit 230 on line 232 is applied to the input of a $T$ shift register and logic means 234. The value of M is an integer which may be selected to reduce the number of impulses on line 232 to within a range economically handled by the shift register portion of the means 234.

This $T$ shift register and logic means 234 has two outputs represented by lines 236 and 238. Whenever the value of $Tf_1/M$ on line 232 is equal to or less than a number $p$, the output on line 236 will be positive and, whenever the output value on line 232 is greater than $p$, the output on line 238 will be positive.

The output lines 236, 238 are connected to the control or gate terminals of field effect transistors Q1 and Q2, respectively, which are connected by lines 28, 28a to receive the output of the function generator means 14. Transistor Q1 is further connected via line 240 to a plurality of resistors R1–R4 which are connected in series with field effect transistors Q3–Q6, respectively, to a line 242. Transistor Q2 is similarly connected via line 244 to resistors R5–R8 which are connected in series with field effect transistors Q7–Q10, respectively, to the line 242.

The conductivity of the transistors Q3–Q10 is controlled in accordance with the aspect angle $\theta$. To this end, a divide by N circuit 246 is connected to receive, via line 32, the output of gate 64 of FIG. 2, which output consists of $i\ T_2|\cos \theta|$ cycles at frequency $f_2$. Since $f_2=2Sf_1/ic\ T_2$, the number of cycles passed by the gate 64 equals $2s\ f_1/c|\cos \theta|$. The quantity $2s\ f_1/c$ is a constant. Therefore the input to the divide by N circuit 246 is proportional to $|\cos \theta|$. Likewise the output on line 250 is proportional to $|\cos \theta|$. The value of N is an integer which is selected in accordance with the resolution desired for $\theta$ with respect to its effect on the amplitude attenuation of the output on lines 28, and in accordance with the economics of a $\theta$ shift register and logic means 252. The $\theta$ shift register and logic means 252 is similar to the $T$ shift register and logic means 234, but has four output lines 256, 258, 260, and 262 on which logic "ones" appear as positive voltage conditions in accordance with the input on line 250. Line 256 is connected to the control electrodes of transistors Q6 and Q10; line 258 is connected to control Q5 and Q9; 260 is connected to control Q4 and Q8; and line 262 is connected to control Q3 and Q7.

In the present example, assume that $2s\ f_1/c=48\ \cos\ \theta$ and $N=4$. The following table then holds:

| $\theta$ | $48 \cos \theta$ | $48 \cos \theta /4$ |
|---|---|---|
| 90° | 0 | 0 |
| 60° | 24 | 6 |
| 30° | 41 | 10 |
| 0° | 48 | 12 |

Since the greatest value of $$\frac{48|\cos \theta|}{4}$$

equals 12, a 12-stage register would be required in the shift register and logic means 252. Moreover, the logic portion of means 252 are selected in this example to give a logical "one" (transistor "on" signal) at the lines 256, 258, 260, and 262 in accordance with the following table:

| $48 \cos \theta /4$ | Angular Sector | Transistor "on" Signal on line |
|---|---|---|
| 0–3 | 90°–70° | 256 |
| 4–8 | 70°–41° | 258 |
| 9–10 | 41°–23° | 260 |
| 11–12 | 23°–0° | 262 |

The line 242, commonly connected to one side of each of the transistors Q3–Q10, is connected to an output resistor R9 from which the simulated echo frequency output is taken on line 34. A detector 266 is connected by line 268 to line 242 to derive a rectified output on line 36 useful for video presentations of the simulated echo.

In operation, the signal across R9 will be approximately R9/R9+one of R1–R8 times the input signal at line 28. The resistors R1–R8 are assigned differing values such that the attenuation will be appropriate for the echo pulse length and the aspect angle $\theta$ of the target.

What is claimed is:

1. Apparatus for generating electrical signals simulative of sonar echoes for example in a sonar simulator capable of providing inputs representing keying, insonification frequency $f_1$, and insonification pulse length $T$, and target aspect angle $\theta$, said apparatus comprising:

pulse function generator means (14) comprising a plurality of pulse function generators (160–161) each operative to provide a pulsed CW output of frequency $f_1$ and length $T$ in response to a trigger pulse, a first (160) of said pulse function generators being adapted to receive a start trigger pulse representing keying;

$2s/C | \cos \theta |$ and highlight generator means (12) responsive to said pulsed CW output of said first pulse function generator (160) and to an input representative of $\theta$ to provide as a plurality of outputs highlight trigger pulses each representing the time of occurrence of a highlight echo;

said pulse function generators (161–165) other than said first function generator each being responsive to one of said highlight trigger pulses to provide an output signal of length $T$ and frequency $f_1$, each starting at a time appropriate to an assigned highlight;

attenuator means (191–195) for effecting predetermined attenuation of each of the outputs of said other pulse function generators, and summing means 196. 198) for combining the attenuated outputs of said other pulse function generators into a composite signal having an envelope which is representative of highlight amplitude and distribution.

2. Apparatus as defined in claim 1, and wherein said $2s/C | \cos \theta |$ and highlight generator means comprises:

single-shot multivibrator means (52) responsive to said pulsed CW output of said first pulse function generator (160) to provide an output pulse for each cycle of said pulsed CW and having a width proportional to $| \cos \theta |$;

first gate means (64) responsive to the output pulses of said multivibrator means and to counting means (74), to pass a number proportional to $| \cos \theta |$, of cycles of a frequency $f_2$ to a count and hold means (72);

means (112) responsive to said start trigger signals to provide readout trigger pulses having a predetermined time delay with respect to said start trigger signals;

gate pulse generator means (106) for initiating gate pulses in response to said readout trigger pulses;

counter means (86);

second gate means (90) responsive to said gate pulses from gate pulse generator means (106) to pass cycles of frequency $f_1$ to said counter means (86);

comparator means (82) connected to said count and hold means (72) and said counter means (86), said comparator means being operative to provide an output signal each time the count in said counter means (86) equals a count being held in said count and hold means (72);

shift register means (98) having a plurality of output stages and responsive to said output signals of said comparator means (82) to provide as output signals on predetermined successive ones of said stages said highlight trigger signals.

3. Apparatus as defined in claim 2, and wherein:

said $2s/C | \cos \theta |$ and highlight generator further comprises additional shift register means (100) having a plurality of output stages and responsive to said output signals of said comparator means (82) to provide as output signals on predetermined successive ones of said output stages of said additional shift register means additional highlight trigger signals; and said pulse function generator means further comprises logic means (170) responsive to inputs indicative of bow or stern aspect to apply said highlight trigger signals from said shift register means (98) or said highlight trigger signals from said additional shift register means (100), respectively.

4. Apparatus as defined in claim 3, and further comprising echo amplitude adjustment means (18) for attenuating said composite signal output of said summing means in accordance with insonifying pulse length and aspect angle $\theta$.

5. Apparatus as defined in claim 4, and wherein said amplitude adjustment means comprises:

first divider means (230) connected to receive the pulsed CW output of said first pulse function generator and operative to divide the number of cycles therein by an integer $M$ to provide output pulses at a frequency proportional to the insonification pulse length T;

a $T$ shift register and logic means (234) connected to receive as an input the output of said first frequency divider means and operative to provide a first output when said input thereto bears a first predetermined relation to an integer $p$ and a second output when said input bears a second predetermined relation to said integer $p$;

second and third attenuator means (R1–R4, R5–R8);

third and fourth gate means (Q1, Q2) connected to the output of said pulse function generator means (14), said third and fourth gate means being responsive to said first and second outputs, respectively, of said $T$ shift register and logic means (234) to pass said composite signal alternatively to said second and third attenuator means.

6. Apparatus as defined in claim 5, and wherein said amplitude adjustment means further comprises:

second divider means (246) connected to receive said output of said $i$ count gate 64 and operative to effect division thereof by an integer $N$ to provide output pulses at a frequency proportional to $| \cos \theta |$;

a $| \cos \theta |$ shift register and logic means (252) connected to receive as an input the output of said second divider means and operative to provide a plurality of outputs each representative of $\theta$ being in a different predetermined sector;

each of said second and third attenuator means comprising a plurality of resistors equal in number to the plurality of outputs of said $| \cos \theta |$ shift register and logic means;

a plurality of additional gate means (Q3–Q10) each connected in series with one of said resistors said additional gate means being responsive to said plurality of outputs of said $| \cos \theta |$ shift register and logic means (252) to connect selected ones of said resistors to a final output line whereby said composite signal is attenuated in accordance with the aspect angle $\theta$ as well as with the pulse length T.

7. Apparatus as defined in claim 2, and further comprising echo amplitude adjustment means (18) for attenuating said composite signal output of said summing means in accordance with insonifying pulse length and aspect angle $\theta$.

8. Apparatus as defined in claim 7, and wherein said amplitude adjustment means comprises:

first divider means (230) connected to receive the pulsed CW output of said first pulse function generator and operative to divide the number of cycles therein by an integer $M$ to provide output pulses at a frequency proportional to the insonification pulse length T;

a $T$ shift register and logic means (234) connected to receive as an input the output of said first frequency divider means and operative to provide a first output when said input thereto bears a first predetermined relation to an integer $p$ and a second output when said input bears a second predetermined relation to said integer $p$;

second and third attenuator means (R1–R4, R5–R8);

third and fourth gate means (Q1, Q2) connected to the output of said pulse function generator means (14), said third and fourth gate means being responsive to said first and second outputs, respectively, of said $T$ shift register and logic means (234) to pass said composite signal alternatively to said second and third attenuator means.

9. Apparatus as defined in claim 8, and wherein said amplitude adjustment means further comprises:

second divider means (246) connected to receive said output of said $i$ count gate 64 and operative to effect division thereof by an integer $N$ to provide output pulses at a frequency proportional to $|\cos \theta|$;

a $|\cos \theta|$ shift register and logic means (252) connected to receive as an input the output of second divider means and operative to provide a plurality of outputs each representative of $\theta$ being in a different predetermined sector;

each of said second and third attenuator means comprising a plurality of resistors equal in number to the plurality of outputs of said $|\cos \theta|$ shift register and logic means;

a plurality of additional gate means (Q3–Q10) each connected in series with one of said resistors said additional gate means being responsive to said plurality of outputs of said $|\cos \theta|$ shift register and logic means (252) to connect selected ones of said resistors to a final output line whereby said composite signal is attenuated in accordance with the aspect angle $\theta$ as well as with the pulse length T.